United States Patent
Roll et al.

(10) Patent No.: US 7,143,874 B2
(45) Date of Patent: Dec. 5, 2006

(54) SURGE BRAKE ACTUATOR

(75) Inventors: Michael J. Roll, Wausau, WI (US); Kawa-She-Quoen Wm. Okerlund, Wittenberg, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 10/946,216

(22) Filed: Sep. 21, 2004

(65) Prior Publication Data

US 2005/0035652 A1 Feb. 17, 2005

Related U.S. Application Data

(63) Continuation of application No. 10/264,291, filed on Oct. 2, 2002, now Pat. No. 6,848,546.

(51) Int. Cl.
*B60T 7/20* (2006.01)

(52) U.S. Cl. .............. 188/112 R; 188/148; 188/151 A; 188/2 D; 188/200; 188/3 H; 188/347; 280/432; 280/446.1; 280/511

(58) Field of Classification Search .................. 303/7, 303/9, 123; 188/112 R, 3 H, 3 R, 2 A, 2 D, 188/142, 148, 347, 345, 200, 151 A; 280/446.1, 280/432, 511; 74/506.1, 575, 577 M, 578
See application file for complete search history.

(56) References Cited

U.S. PATENT DOCUMENTS

| | | | |
|---|---|---|---|
| 2,354,268 A | 7/1944 | McNamara, Jr. | |
| 2,706,536 A | 4/1955 | Stott | |
| 3,144,101 A | 8/1964 | Hahn | |
| 3,768,606 A | 10/1973 | Mizen et al. | |
| 3,796,287 A | 3/1974 | Kolm | |
| 3,881,577 A * | 5/1975 | Wherry et al. .......... | 188/112 R |
| 4,223,766 A | 9/1980 | Huetsch et al. | |
| 4,239,252 A | 12/1980 | Huetsch et al. | |
| 4,402,523 A | 9/1983 | Knowles | |
| 4,817,978 A * | 4/1989 | James ........................ | 280/487 |
| 4,840,256 A | 6/1989 | Webb | |
| 4,889,212 A | 12/1989 | Temple | |
| 5,013,059 A * | 5/1991 | Goettker .................. | 280/446.1 |
| 5,246,243 A | 9/1993 | Carr | |
| 5,464,078 A | 11/1995 | Pittman | |
| 5,485,900 A * | 1/1996 | Denny ..................... | 188/112 R |
| 5,492,204 A * | 2/1996 | Wallace ................... | 188/112 R |

(Continued)

FOREIGN PATENT DOCUMENTS

GB 2077867 12/1981

OTHER PUBLICATIONS

Demco -Dethmers mfg co. DA10 Mar. 25, 1999.*

(Continued)

*Primary Examiner*—Devon Kramer
(74) *Attorney, Agent, or Firm*—Robert H. Earp, III; McDonald Hopkins Co., LPA

(57) ABSTRACT

A surge brake actuator is disclosed. The actuator includes an actuator housing and a coupler housing movably engaged within the actuator housing. Upper and lower coupler slide channels formed from a plastic material are releasably connected to the coupler housing and contact the actuator housing. The plastic coupler slide channels reduce frictional loss and provides superior brake actuation output when the coupler housing retracts into the actuator housing during braking. The surge brake actuator includes a push rod assembly that also provides superior brake actuation output to the actuator and can engage the actuator during a breakaway event. The surge brake actuator includes a releasably engagable reverse lock that prevents brake actuation while the towing vehicle moves in reverse.

19 Claims, 8 Drawing Sheets

U.S. PATENT DOCUMENTS

| | | | |
|---|---|---|---|
| 5,678,664 A * | 10/1997 | Marasco | 188/112 R |
| 5,771,996 A | 6/1998 | Marasco | |
| 5,855,418 A | 1/1999 | Greaves | |
| 6,035,977 A | 3/2000 | Marasco | |
| 6,289,779 B1 * | 9/2001 | Wang | 83/759 |
| 6,375,211 B1 | 4/2002 | MacKarvich | |
| 6,386,337 B1 | 5/2002 | Pribula | |

OTHER PUBLICATIONS

Demco—Dethmers Manufacturing Company—DA10 Actuator Operator's Manual, dated Mar. 25, 1999.

* cited by examiner

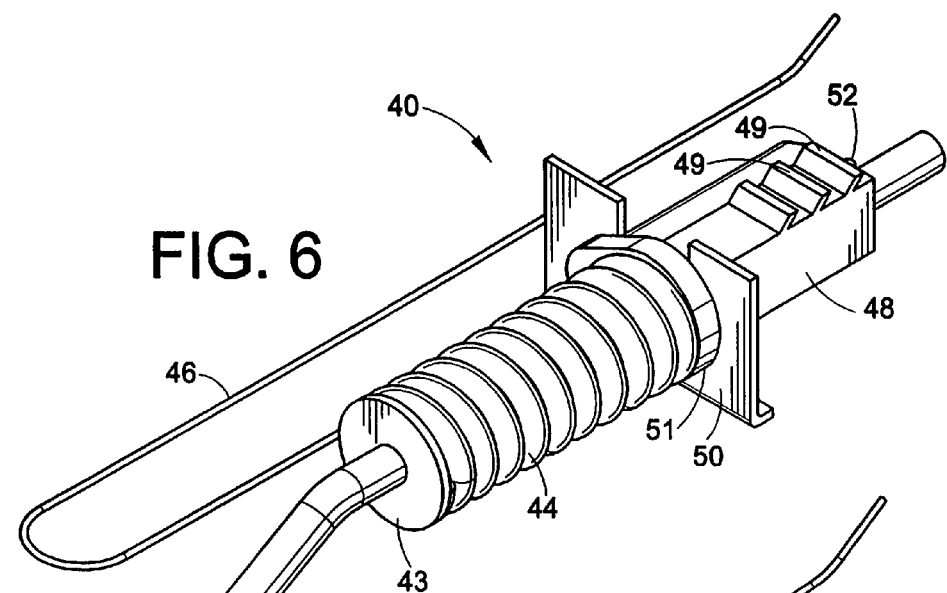
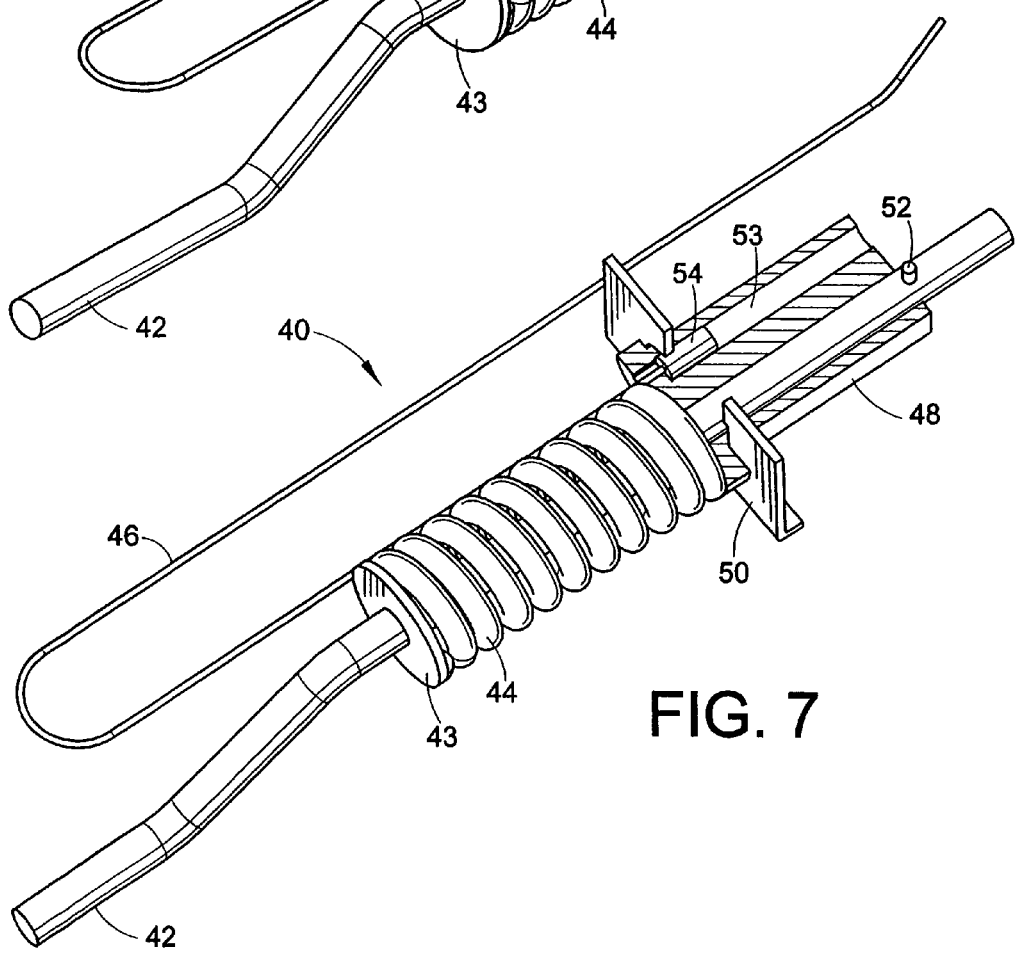

SURGE BRAKE ACTUATOR

RELATED APPLICATION

This application is a continuation of application Ser. No. 10/264,291 filed Oct. 2, 2002 now U.S. Pat. No. 6,848,546.

FIELD OF THE INVENTION

The present invention relates to a surge brake actuator used in connecting a towed vehicle to a towing vehicle. Particularly, the present invention relates to a surge brake actuator that includes a means for actuating the braking mechanism of a towed vehicle.

BACKGROUND OF THE INVENTION

For towed vehicles, such as trailers, it is common to provide a self-contained hydraulic braking system that operates independently of the braking system on the towing vehicle. A surge brake actuator allows the towed vehicle to utilize its own braking system that operates when the towing vehicle brakes. The surge brake actuator generally includes a coupler housing component attached to the towing vehicle and a hydraulic cylinder component that actuates the brakes on the towed vehicle. The surge brake actuator operates in such a manner that when the towing vehicle brakes, the towed vehicle's forward momentum creates a decelerating force on the towing vehicle and the coupler housing attached to the towing vehicle. The hydraulic cylinder utilizes the resultant decelerating force on the coupler housing component to create a fluid pressure that actuates the brakes of the towed vehicle.

The output pressure of the braking system is a function of the ability of the brake actuator to convert the deceleration forces provided by the towing vehicle into hydraulic pressure to actuate the towed vehicle brakes. This force/pressure ratio is an important component in the ability of an actuator to provide braking pressure to the towed vehicle. To date, various designs of known brake actuators inefficiently convert the decelerating force to fluid pressure. Reasons for such inefficient conversion of the decelerating force to fluid pressure include: a build-up of road debris in the actuator; corrosion or rust bonding of actuator components; high frictional loss from actuator components; and coupler housing interference.

Breakaway mechanisms on brake actuators are generally known. These mechanisms generally operate through a cable or chain that is attached to a towing vehicle by means of an S-hook or similar attachment device. The opposite end of the cable is operably connected to the towed vehicle's braking system. When the towed vehicle becomes detached from the towing vehicle during operation, the towed vehicle, no longer being pulled by the towing vehicle, tends to change position relative to the towing vehicle. The S-hook, however, remains attached to the towing vehicle. As the towing vehicle pulls the cable, the cable actuates the towed vehicle brake mechanism, thereby stopping the towed vehicle. To maintain pressure on the cable and prevent the cable from releasing the towed vehicle braking mechanism, a friction lock is generally used to prevent the cable from retracting and prematurely releasing the towed vehicle brake. Although such mechanisms are generally adequate to stop a breakaway trailer in most circumstances, they do possess several inherent drawbacks.

Most known systems operate by means of a friction lock to prevent the extended cable from retracting. During connection and disconnnection of the towed vehicle to the towing vehicle, the cable is often pulled toward the towing vehicle. Even a slight tug is often enough to actuate the breakaway mechanism slightly, or to cause dangerous slack in the cable when the friction lock prevents the cable from returning taught after connection to the towing vehicle. Even though the brake mechanism may be actuated only somewhat, this slight activation can cause excessive wear on the towed vehicle brake and an excessive burden on the pulling vehicle that decreases fuel mileage and increases maintenance costs. Over time, this excessive burden could even cause the towed vehicle brake to fail in an emergency situation due to premature lining wear or overheating.

Another feature found on certain brake actuators is a reverse lock-out assembly. Known reverse lock-out assemblies prevent accidental actuation of the towed vehicle brakes when the towing vehicle backs up or reverses. These known reverse lock-out assemblies are not reliable because they allow for the possibility of accidentally disengaging while the towing vehicle moves in reverse. Additionally, the design of these reverse lock out assemblies are awkward to use, which can also increase the unreliability of such known assemblies.

It would be beneficial to have a surge brake actuator that can overcome these problems associated with the inefficient conversion of decelerating force to fluid pressure. Furthermore, it would be beneficial to provide improvements to one or more of the components of the surge brake actuator that would improve the force/pressure conversion.

It would also be beneficial to have a surge brake actuator having a breakaway mechanism that safely and reliably operates when the actuator decouples from the towing vehicle.

It would also be beneficial to have a surge brake actuator having a reverse lock-out assembly that is simple to use and reliably prevents brake actuation when the assembly is engaged and the towing vehicle operates in reverse while reliably disengaging when the towing vehicle moves forward.

SUMMARY OF THE INVENTION

A surge brake actuator is provided that includes a coupler housing and an actuator housing that is interconnected with the coupler housing so that the coupler housing extends and retracts within the actuator housing. At least one coupler housing slide channel is connected to the coupler housing and is in contact with an inner portion of the actuator housing. The coupler housing slide channel moves between a towing position and braking position with the coupler housing while maintaining contact with the actuator housing.

Preferably, the coupler housing slide channel is plastic. The plastic coupler housing slide channel reduces frictional losses when the actuator engages from a towing position to a braking position. Also, the actuator preferably includes an upper and lower coupler housing slide channel connected to the upper and lower sides of the coupler housing, respectively, and in contact with the inner portion of the actuator housing. The upper and lower coupler housing slide channels are preferably connected to the coupler housing by one or more flanges. The flanges also permit the coupler housing slide to move with the coupler housing when the actuator is engaged. The upper and lower coupler housing slide channels also preferably include rails along its longitudinal edges that prevent the slide channels from moving laterally on the coupler housing.

A preferred embodiment of the present surge brake actuator includes a push rod assembly having a first end connected to the coupler housing and a second end connected to a braking system that is connected to the actuator housing. The assembly includes a push rod, a compression spring secured to the push rod, a push rod slide connected to the push rod, and a lanyard having an end connected to the push rod slide. Preferably, the push rod is offset which provides a reduced straight length of the push rod and exhibits improved resistance to bending over straight push rods.

The push rod assembly can further include a bracket connected to the coupler housing. An end of the push rod slide is adjacent to the bracket. The bracket transfers the decelerating force on the coupler housing onto the compression spring through the push rod and into the braking system. The push rod assembly can also include a retaining pin attached to the push rod to retain the push rod slide. The retaining pin maintains the radial orientation of the push rod to the braking system.

In another preferred embodiment, the actuator includes a reverse lock. The lock prevents the actuation of the brakes while the towing vehicle moves in a reverse direction. The lock preferably includes a lever and a engaging portion at an end of the lock. A user pushes the lever toward the towed vehicle end of the actuator and upward to engage the lock. The lock further includes a tension spring that assists the lock in disengaging when the towing vehicle moves in a forward direction.

The present brake actuator may further include a breakaway mechanism system including a lanyard, lanyard holder, push rod assembly, rotating roller, roller pin, and upper and lower slide channels. One or more components of the breakaway mechanism system operate if the actuator decouples from the towing vehicle in order to actuate the brakes of the towed vehicle.

Still other advantages and benefits of the invention will become apparent to those skilled in the art upon a reading and understanding of the following detailed description.

DESCRIPTION OF THE DRAWINGS

The invention may take physical form in certain parts and arrangements of parts, a preferred embodiment and method of which will be described in detail in this specification and illustrated in the accompanying drawings that form a part hereof, and wherein:

FIG. 6 shows a perspective view of a push rod assembly 40.

FIG. 7 shows a perspective, partial cross-sectional view of a push rod assembly 40.

DETAILED DESCRIPTION OF THE PREFERRED EMBODIMENT

Figure 1:
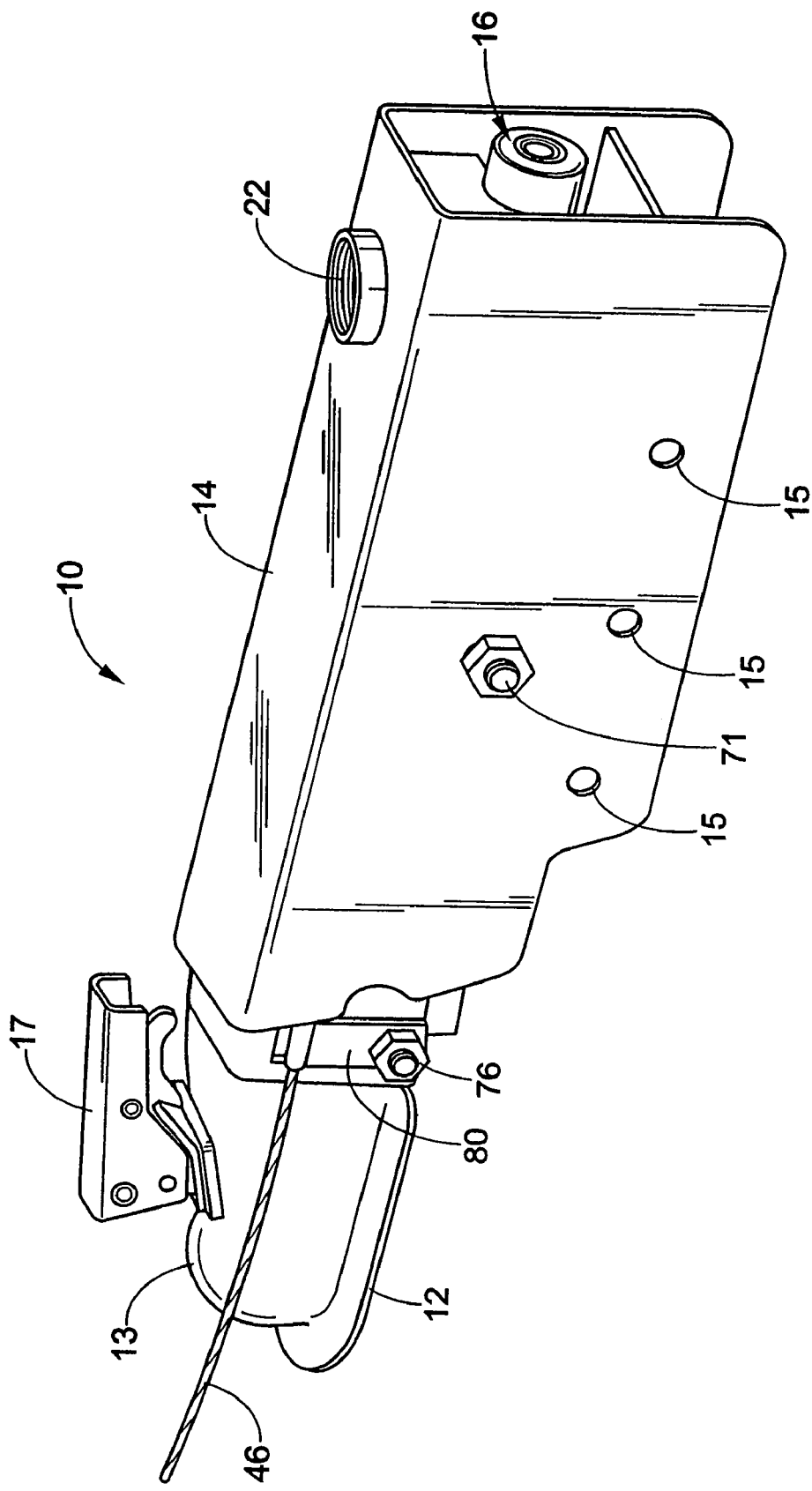
FIG. 1 shows a perspective view of a surge brake actuator 10.

Referring now to the drawings, wherein the drawings are for the purposes of illustrating the preferred embodiment of the invention only and not for purposes of limiting the same, FIG. 1 shows a surge brake actuator 10 including a coupler housing 12 and an actuator housing 14. The actuator housing 14 is preferably constructed of metal and is rigidly mounted to a towed vehicle frame by bolts (not shown) extending through openings 15 on the actuator housing 14. The actuator housing 14 not only affords the brake actuator 10 an aesthetically pleasing appearance, but also protects the components within the actuator 10 from exposure to the elements. The actuator housing 14 includes an open space (not shown) of adequate size on the bottom side that allows road debris to move through the actuator 10 to avoid impeding actuation. The open space creates less sensitivity to external crushing or bending that would also impede actuation.

Figure 2:
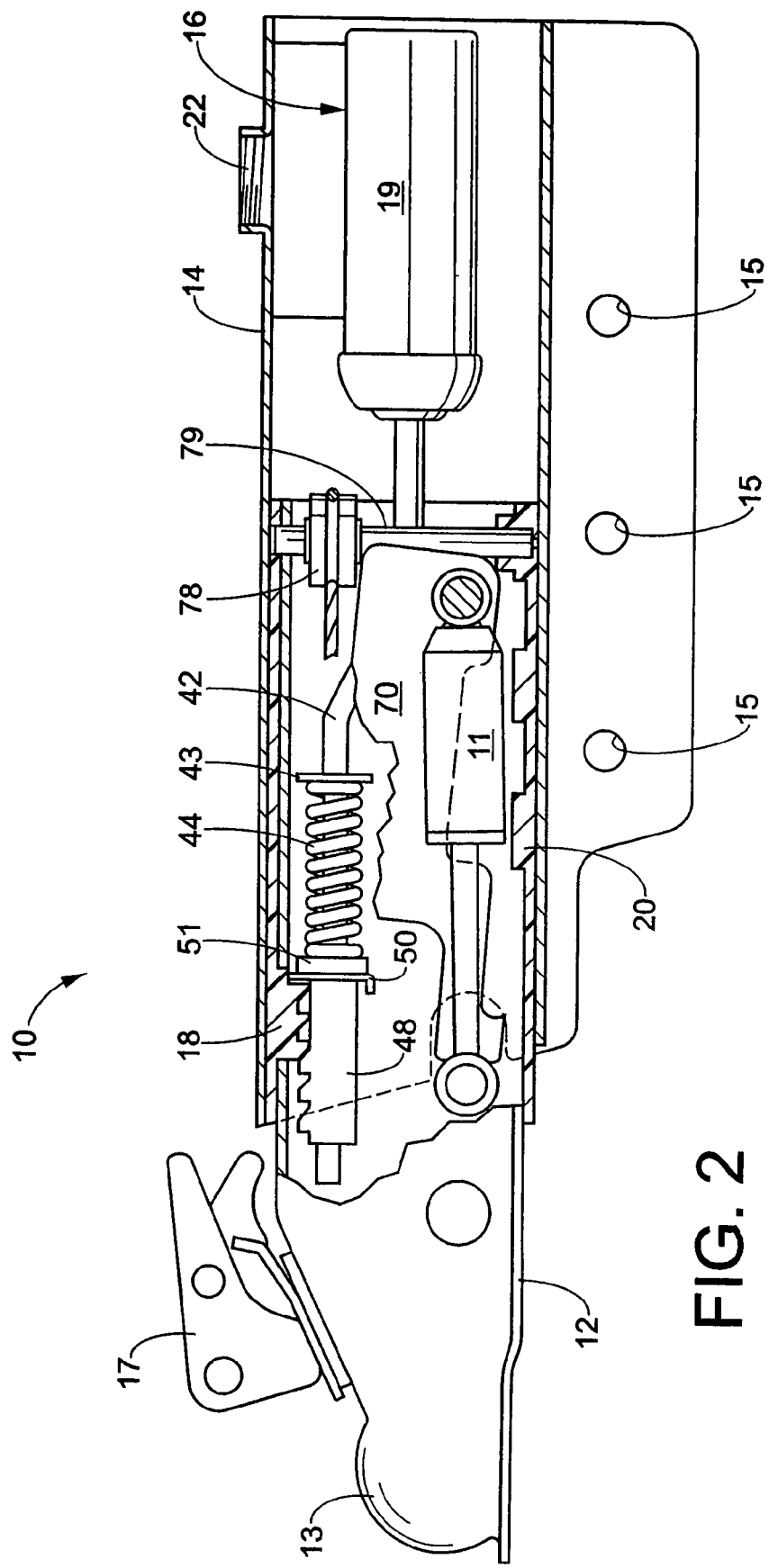
FIG. 2 shows a cross-sectional side view of a surge brake actuator 10.

Referring now to FIG. 2, the coupler housing 12 is interconnected with the actuator housing 14 such that it extends and retracts within the actuator housing 14 in a telescopic fashion. During normal operation where the actuator 10 is connected to the towing vehicle and towed vehicle, the coupler housing 12 is in an extended position relative to the actuator housing 14 when the towing vehicle is not braking, whereas the coupler housing 12 is in a retracted position relative to the actuator housing 14 when the towing vehicle is braking. Both the coupler housing 12 and the actuator housing 14 are generally rectangular in shape. The coupler housing 12 includes a ball-type hitch 13 that can be either rigidly or releasably secured to the coupler housing 12. When the ball-type hitch 13 is releasably secured to the coupler housing 12, connecting means such as bolts or any other releasable connecting means can connect the housing 12 to the hitch 13. In the particular embodiment shown in FIG. 2, the hitch 13 is integral with the coupler housing 12 so that the coupler housing 12 is a single-piece construction. The ball-type hitch 13 is secured to the towing vehicle by means of a locking assembly 17 to prevent the hitch 13 from detaching from the towing vehicle as the towed vehicle is being pulled. The actuator 10 may optionally include a damper shock 11 having one end connected to the coupler housing 12 and another end connected to the actuator housing 14. The damper shock 11 dampens the inertia of the trailed vehicle and acts to smooth out any oscillating or jerking motion between the coupler housing 12 and the actuator housing 14.

A braking system 16 is located on the inner portion and at the end of the actuator housing 14 adjacent to the towed vehicle. The braking system 16 is preferably a hydraulic master cylinder 19 that is operably connected to brakes on the towed vehicle wheels (not shown). The master cylinder 19 includes a reservoir 22 where a user may add hydraulic brake fluid. The master cylinder 19 is secured to the actuator housing 14 by any known connecting means such as bolts.

In operation, when a towing vehicle engages its brakes, a force is created on the towing vehicle by the forward momentum of the towed vehicle. This force retracts the coupler housing 12 into the actuator housing 14. The retraction of the coupler housing 12 into the actuator housing 14 transfers the decelerating force into the braking system 16. The braking system 16 then converts the decelerating force into fluid pressure by moving hydraulic fluid from the master cylinder 19 to the towed vehicle brakes. The hydraulic fluid transferred to the towed vehicle brakes actuates those brakes.

Once the towed vehicle has slowed down to the towing vehicle speed or the towing vehicle has sped up to the towed vehicle speed, the coupler housing 12 moves away from the actuator housing 14 thereby deactivating the braking system 16 and releasing the towed vehicle brakes.

Upper and lower coupler slide channels 18 and 20 are attached to the coupler housing 12. The upper and lower coupler slide channels 18 and 20 are preferably molded from a plastic that can withstand high compression loads and have a low coefficient of friction. The upper and lower coupler slide channels 18 and 20 contact and slide on the inner wall of the metallic actuator housing 14 so that a metal-plastic sliding surface occurs. The metal-plastic sliding surface greatly reduces the frictional loss between the two components. As the slide channels 18 and 20 are preferably made of plastic, the channels will not rust which would otherwise inhibit actuator movement and output braking pressure.

Figure 3A:
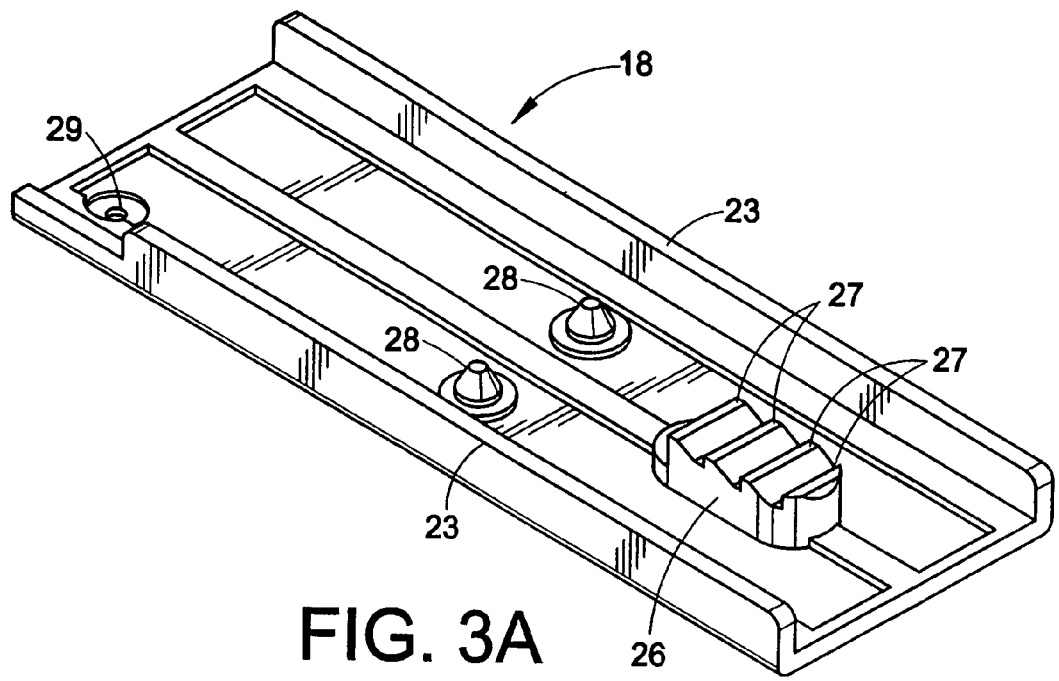
FIG. 3A shows a perspective view of an upper coupler slide channel 18.
Figure 3B:
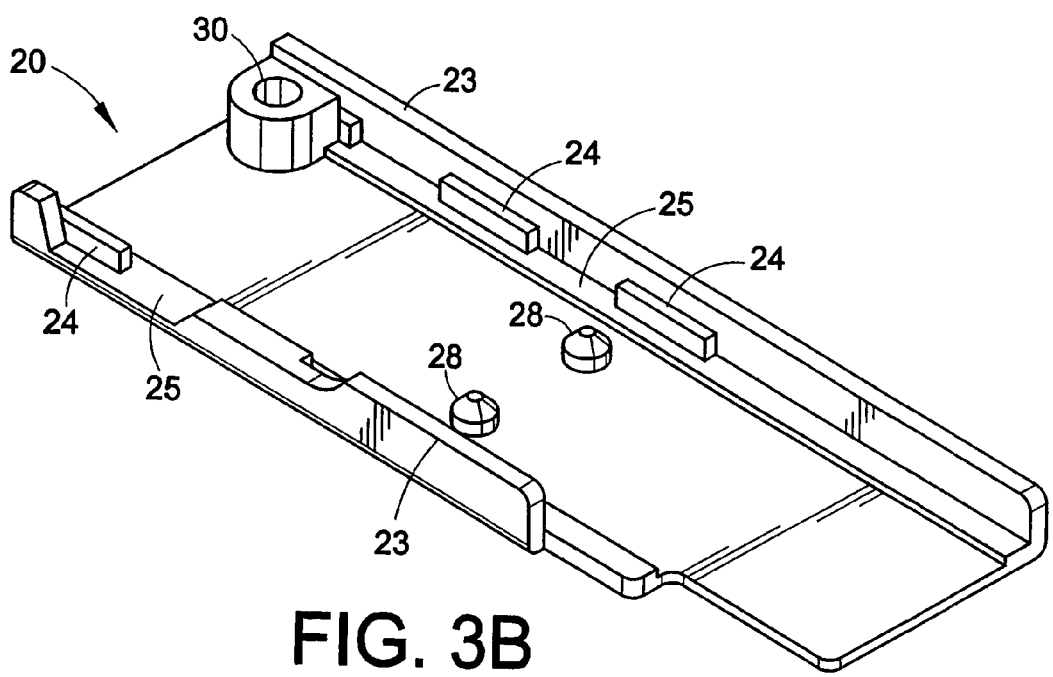
FIG. 3B shows a perspective view of a lower coupler slide channel 20.

FIGS. 3A and 3B show the upper coupler slide channel 18 and lower coupler slide channel 20, respectively. The upper and lower coupler slide channels 18 and 20 include one or more rails 23 along the longitudinal edges of the slide channels 18 and 20. The rails 23 prevent the slide channels 18 and 20 from moving laterally on the coupler housing 12. Also, the rails 23 contact the sides of the actuator housing 14 so that each of the upper and lower slide channels 18 and 20 contact at least three sides of the actuator housing 14.

One or more flanges 24 are located on at least one of the slide channels 18 and 20. Preferably, the flanges 24 are adjacent and extend parallel to the rails 23. One or more recesses 25 are formed between the flanges 24. The flanges 24 provide a means of attaching the slide channels 18 and 20 to the coupler housing 12. Preferably, the slide channels 18 and 20 are attached to the coupler housing 12 as the flanges 34 (see FIG. 4A) of the coupler housing 12 fit into corresponding recesses 25 formed between the flanges 24 of the slide channels 18 and 20, and the flanges 24 of the slide channels 18 and 20 fit into the corresponding recesses 35 of the coupler housing 12. The flanges 24 allow the slide channels 18 and 20 to move concurrently with the coupler housing 12 when the actuator 10 is engaged. The flanges 24 are preferably rectangular, although other shapes are contemplated.

In addition to the flanges 24, FIG. 3A shows a protrusion 26 molded on the upper coupler slide channel 18. The protrusion 26 engages a slot 32 on the top side of the coupler housing 12 and acts as an additional flange. Also, the protrusion 26 includes a plurality of teeth 27 that engage a plurality of teeth 49 on a push rod slide 48 (see FIG. 5) and act as a ratcheting device during a breakaway event. The upper and lower slide channels 18 and 20 include one or more pins 28. The pins 28 align and level the slide channels 18 and 20 with the flanges of the coupler slide 24 and act as a shock absorber aligning device. FIG. 3A further shows a hole 29 on the upper slide channel 18 for accepting a roller pin 79 (see FIG. 2). FIG. 3B further shows the lower slide channel 20 having an embossment 30 molded onto the lower slide channel 20 for accepting a roller pin 79 (see FIG. 5).

Figure 4A:
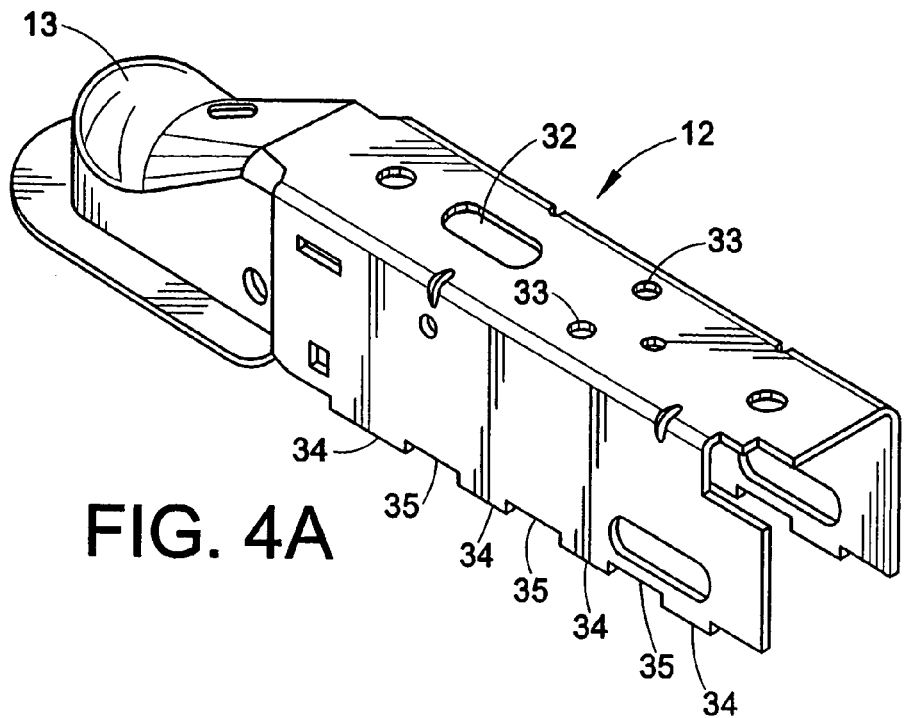
FIG. 4A shows a perspective view of a coupler housing 12.

FIG. 4A shows the coupler housing 12. The coupler housing 12 includes an opening 32 for receiving the protrusion 26 of the upper coupler slide channel 18. The coupler housing 12 further includes one or more apertures 33 for receiving pins 28. The coupler housing 12 includes one or more flanges 34 that correspond to the recesses 25 of the slide channels 18 and 20 and one or more recesses 35 that correspond to the flanges 24 of the slide channels 18 and 20.

Figure 4B:
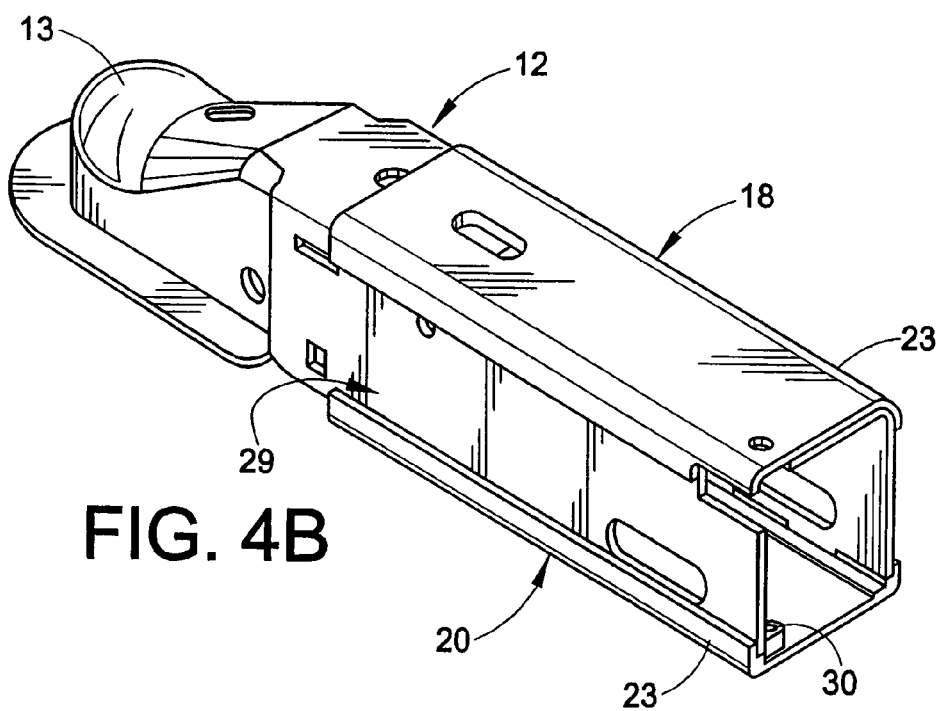
FIG. 4B shows a perspective view of a coupler housing 12 including upper and lower coupler slide channels 18 and 20.

FIG. 4B shows the upper and lower slide channels 18 and 20 on the coupler housing 12. The rails 23 of the upper and lower slide channels 18 and 20 contact the sides of the coupler housing 12. When the slide channels 18 and 20 are engaged to the coupler housing 12, spacings 29 are formed between the rails 23 of the slide channels 18 and 20 and the walls of the actuator housing 14 and coupler housing 12. The spacings 29 allow road debris and particles to move through and out of the actuator 10 and prevent debris and particles from settling in the actuator 10 and disrupting brake actuation. The spacings 29 also allow for additional components having a relatively low profile to be included between the side walls of the coupler housing 12 and actuator housing 14 such as a reverse lock 70 (see FIGS. 7 and 8) and a lanyard holder 80 (see FIG. 1).

In operation, when towing vehicle engages its brakes, the upper and lower slide channels 18 and 20 move with the coupler housing 12 as the coupler housing 12 retracts within the actuator housing 14. The upper and lower slide channels 18 and 20 slide and maintain contact with the inner wall of the actuator housing 14. The plastic-metal contact between the slide channels 18 and 20 and actuator housing 14 creates less friction than the conventional metal-metal sliding.

Figure 5:
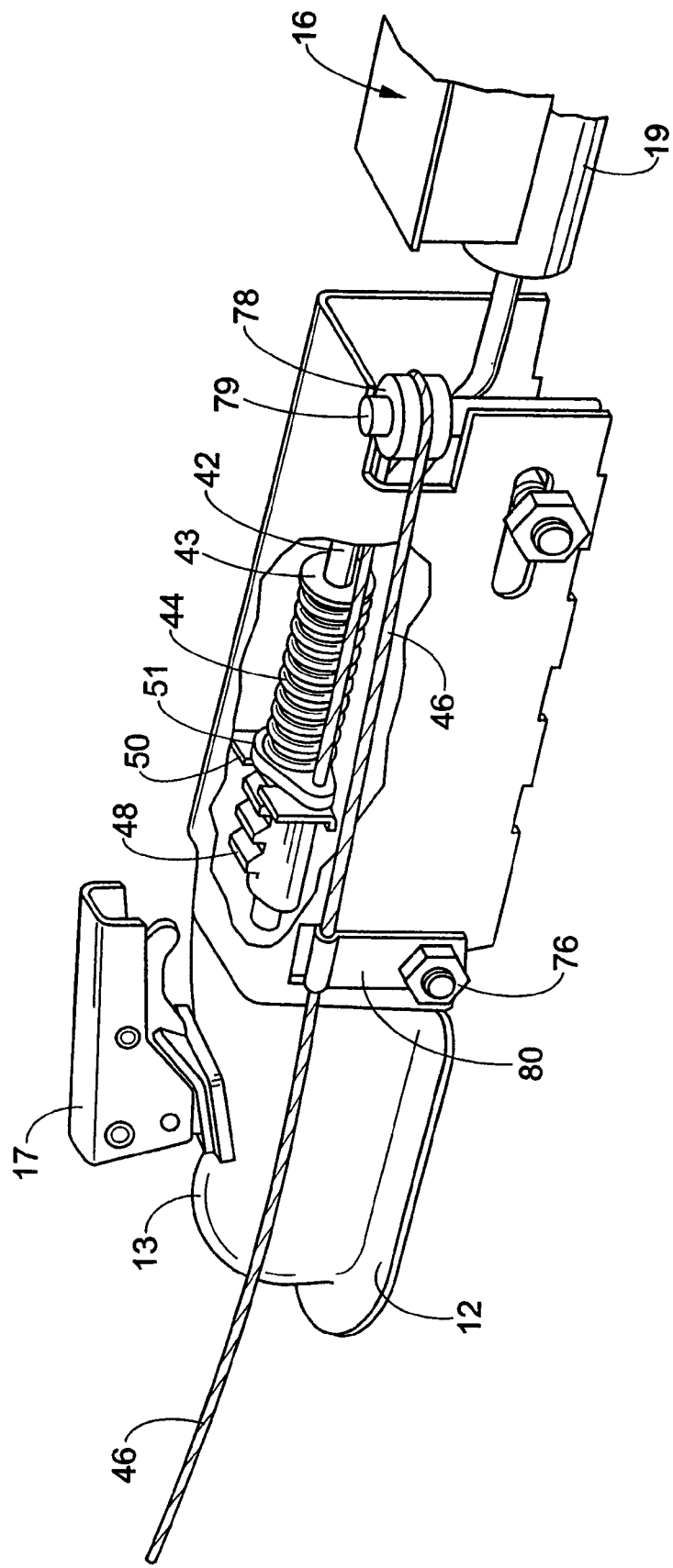
FIG. 5 shows a perspective, partial cross-sectional view of the coupler housing 12 including a push rod assembly 40.

FIGS. 5, 6 and 7 show a push rod assembly 40 located in the coupler housing 12 and actuator housing 14. The push rod assembly 40 links the coupler housing 12 with the braking system 16. The assembly 40 includes a push rod 42, compression spring 44, lanyard 46, push rod slide 48 and bracket 50. The compression spring 44 encircles a portion of the push rod 42 and has one end contacting the push rod slide 48. The compression spring 44 acts as a dampening device to limit the hydraulic pressure of the braking system 16 and to pressurize hydraulic fluid and maintain pressure during a breakaway event.

The push rod slide 48 is engaged to a portion of the push rod 42. The push rod slide 48 includes a collar 51 protruding outwardly on one end of the push rod slide 48. The push rod slide 48 includes a plurality of teeth 49 on one side of the push rod slide 48. The push rod slide 48 further includes a relatively cylindrical aperture 53 (see FIG. 7) located longitudinally within the push rod slide 48 and parallel to the push rod 42 inserted through the push rod slide 48. A lanyard end 54 is located in the aperture 53. The lanyard end 54 is preferably cylindrical or circular shaped and has a diameter larger than the width of the lanyard 46. The aperture 53 allows for simple assembly of the lanyard 46 to the push rod slide 48 by feeding the lanyard 46 through the aperture 53. An opening of the aperture 53 on the end of the push rod slide 48 adjacent to compression spring is large enough to allow the lanyard 46 to pass through but is too small to allow the lanyard end 54 to pass through so that the lanyard end 54 is secured to the push rod slide 48. The position of the lanyard 46 and the lanyard end 54 relative to the push rod slide 48 creates a preferred compression load on the lanyard 46 rather than a less desirable bending load. Also, the position of the lanyard end 54 to the push rod slide 48 is adjacent to the longitudinal centerline of the compression spring 44 so as to reduce as much eccentric loading of the push rod assembly 40 as possible.

The bracket 50 is connected to the coupler housing 12. The bracket 50 includes an opening that engages the push rod slide 48. The collar 51 prevents the push rod slide 48 from further moving through the opening of the bracket 50. The bracket 50 and collar 51 allow the push rod assembly to maintain its position relative to the coupler housing 12 during normal operation while allowing the push rod 42 to engage the brake assembly 16 during brake actuation. The bracket 50 allows the decelerating force of the towed vehicle to transfer to the push rod assembly 40 by transferring the decelerating force to the compression spring 44 through the push rod 42 and into the braking system 16.

The push rod assembly 40 further includes a retaining pin 52. The retaining pin 52 is releasably engaged to the push rod 42 and the push rod slide 48. As the components of the push rod assembly 40 have pre-determined positions, the push rod assembly 40 can be assembled more quickly with the retaining pin 52 than with a screw-type thread design. The retaining pin 52 is releasably engaged into a slot molded into the push rod slide 48 that maintains the radial orientation of the push rod 42 relative to the braking system 16. This radial orientation is critical as it keeps the push rod 42 from falling to either side of the coupler housing 12.

Preferably, the push rod 42 is an offset push rod that provides space savings by reducing its straight length. The offset design of the push rod 42 effectively separates the push rod 42 into two shorter sections that can better resist bending due to compression than a push rod having straight length design. Therefore, the offset push rod 42 can better resist deformations generated by abrupt compressive loads. The push rod 42 further includes a stopper 43 connected to the push rod 42 and abutting the end of the compression spring 44 opposite the end abutting the collar 51 of the push rod slide 50. The stopper 43 maintains the position of the compression spring 44 on the push rod assembly 40.

In operation, when the towing vehicle brakes, the bracket 50 connected to the coupler housing 12 moves with the coupler housing 12 as the coupler housing 12 retracts within the actuator housing 14. The bracket 50 pushes the push rod slide 48 and the push rod 42 connected to the slide 48 by way of the connecting pin 52 rearward toward the braking system 16. The push rod 42 slides into the cylinder 19 of the braking system 16, which forces hydraulic fluid out of the cylinder 19 and into the towed vehicle brakes. The compression spring 44 prevents the push rod 42 from sliding too far into the cylinder 19.

Figure 8:
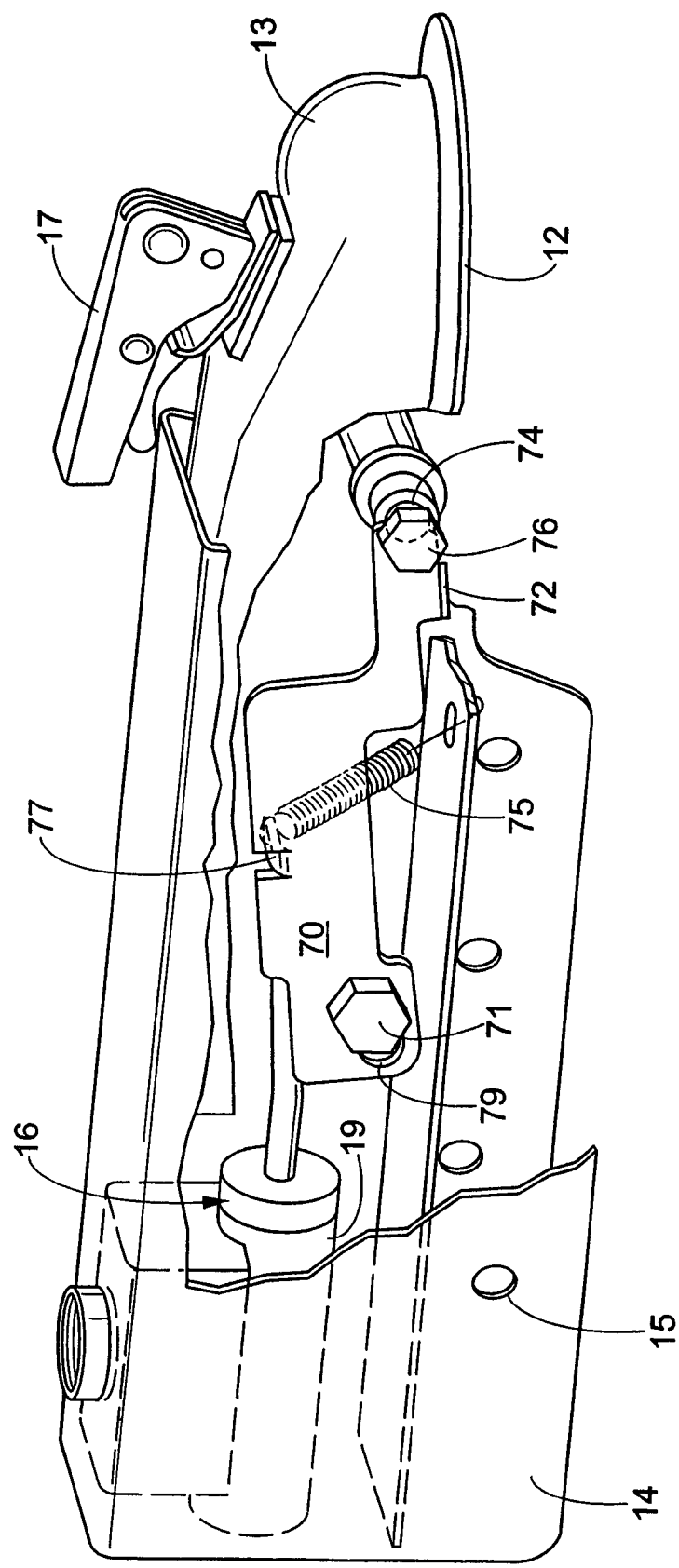
FIG. 8 shows a perspective, partial cross-sectional view of the actuator 10 including a reverse lock 70.
Figure 9:
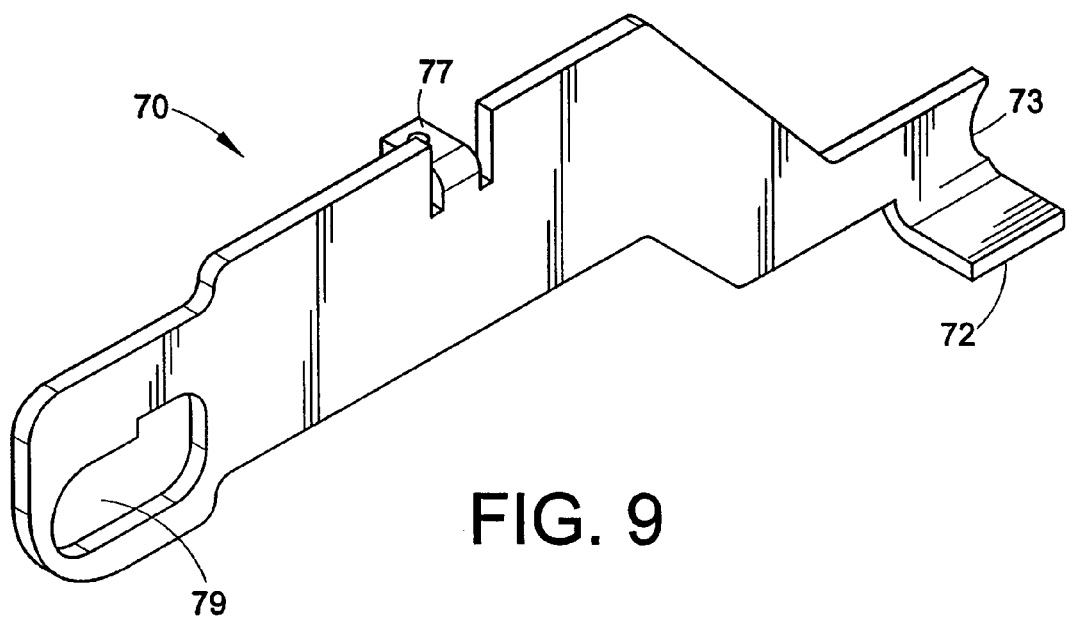
FIG. 9 shows a perspective view of a reverse lock 70.

FIGS. 8 and 9 show a reverse lock 70 that prevents the actuation of the towed vehicle brakes while backing up the towing vehicle-towed vehicle trailer combination. The reverse lock 70 is located between an inner wall of the actuator housing 14 and a corresponding outer wall of the coupler housing 12. The reverse lock 70 is pivotally mounted to an actuator housing bolt 71 by a pivot point 79. The pivot point 79 is a generally ovular or rectangular opening that allows the reverse lock 70 to move in a forward or backward position and in an upward or downward position.

The lock 70 includes a lever 72 and an engaging portion 73 (see FIG. 9) at an end of the reverse lock 70 adjacent to a coupler housing stud 74 and coupler housing bolt 76. The lever 72 protrudes laterally from the lock 70 outwardly beyond the actuator housing 14. The engaging portion 73 is contoured, preferably in a substantially semi-circular or U-shaped contour, to engage the coupler housing 12 by way of a stud 74. The shape of the engaging portion 73 that engages the coupler stud is sufficient to keep the lock 70 from unintentionally disengaging yet will allow some forward movement prior to releasing from the coupler stud 74.

The reverse lock 70 further includes a retainer 77 that is located on the top side of the reverse lock 70. The retainer 77 extends inwardly through an opening located on the coupler housing 12. A tension spring 75 has one end attached to the retainer 77 and another end attached to the bottom plate of the actuator housing 14. The tension spring 75 applies a force to the lever 72 that causes the lever 72 to disengage from the coupler stud 74 during resetting. The lock 70 is designed such that in the unlikely event that the tension spring 75 becomes disengaged from the lever 72, gravity would allow the lever 72 to disengage from the coupler stud 74 and permit safe brake operation.

In operation, a user first pushes the lever 72 toward the end of the actuator 10 connected to the towed vehicle and then upward to engage the contoured engaging portion 73 of the lock 72 to the coupler stud 74. The engagement of the engaging portion 73 to the coupler stud 74 prevents the coupler housing 12 from retracting into the actuator housing 14 and thus prevents actuation of the towed vehicle brakes when the vehicle travels in reverse. When the vehicle begins to move forward, the coupler housing 12 slightly extends from the actuator housing 14 so that the tension spring 75 attached to the lock 70 pulls the lever downward and releases the engaging portion 73 from the coupler stud 74 to allow brake actuation to occur in the forward direction.

Referring back to FIG. 1, a lanyard holder 80 is releasably engaged to the coupler housing 12 by the coupler housing bolt 76. The lanyard holder 80 has a low profile that allows the holder 80 to retract with the coupler housing 12 into the actuator housing 14 due to the opening provided by spacing 29 (see FIG. 4B) during normal braking modes. The lanyard holder 80 maintains the longitudinal position of the lanyard 46 to the outer wall of the coupler housing 12 between the towing vehicle and a rotating roller 78 (see FIG. 2). The lanyard holder 80 also prevents the lanyard 46 from being accidentally tangled with any component near the towing vehicle end of the actuator 10. A rotating roller 78 attached to a roller pin 79 is located through an opening on the coupler housing 12. A groove is located on the rotating roller 78 to retain the lanyard 46 and prevent the lanyard 46 from falling off during slack conditions. The end of the lanyard 46 opposite end 54 is attached to the towing vehicle by an attaching means such as an S-hook, clip, or any other attaching means known in the art.

FIGS. 1–6 show the actuator components that form a breakaway mechanism system to brake and stop a towed vehicle if the actuator 10 would decouple from the towing vehicle. The breakaway mechanical system includes the lanyard 46, lanyard holder 80, push rod assembly 40, rotating roller 78, roller pin 79 and the upper and lower slide channels 18 and 20. During a breakaway event where the towing vehicle is no longer attached to the hitch 13, the lanyard end attached to the towing vehicle is pulled through the lanyard holder 80 toward the towing vehicle. Lanyard end 54 is also pulled and manually engages the push rod assembly 40 to actuate the braking system 16 and create braking pressure on the towed vehicle. Since the direction which a towed vehicle would de-couple from a towing vehicle is unpredictable, the attachment of the lanyard 46 to the coupler housing 12 must allow for any angle of departure. The engagement of the lanyard holder 80 to the coupler housing 12 insures that brake actuation occurs at any departure angle of the brake actuator 10 from the towing vehicle. Also, the roller 78 allows the lanyard 46 to be pulled during a breakaway event without accidental breakage of the lanyard 46 at the roller 78 as the roller 78 substantially reduces the force that would cause breakage.

As the lanyard 46 is pulled from the actuator 10 during breakaway, teeth 49 of the push rod slide 48 engage the mating teeth 27 on the protrusion 26 of the upper slide channel 18. The engagement of the push rod slide teeth 49 with the protrusion teeth 27 prevent the forward motion of the push rod assembly 40 so that the assembly 40 maintains fluid pressure from the braking system 16 to the towed vehicle. Multiple positions of the push rod slide teeth 49 and the protrusion teeth 27 provide incremental levels of fluid pressure and prevent accidental disengaging of the push rod assembly 40 to the brake system 16.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A surge brake actuator comprising:
    an actuator housing;
    a coupler housing telescopically engaged with said actuator housing such that said coupler housing extends and retracts within said actuator housing, said coupler housing having at least one recess located therein; and
    at least one plastic coupler housing slide channel connected to said coupler housing wherein a portion of said slide channel is in contact with an inner portion of said actuator housing and said slide channel includes a plurality of flanges for connecting said slide channel to said coupler housing wherein at least one of said flanges fits into a corresponding said recess of said coupler housing.

2. The surge brake actuator of claim 1, wherein said at least one plastic coupler housing slide channel comprises a plastic upper coupler slide channel and a plastic lower coupler slide channel connected to said coupler housing.

3. The surge brake actuator of claim 2, wherein said plastic upper coupler slide channel includes a protrusion extending from a wall of said upper coupler slide channel extending within said coupler housing.

4. The surge brake actuator of claim 3, wherein said protrusion includes a plurality of teeth on a side of said protrusion.

5. The surge brake actuator of claim 1, wherein said coupler housing includes at least one flange for connecting said coupler housing to said slide channel.

6. The surge brake actuator of claim 1, wherein said slide channel further comprises a rail along each longitudinal edge of said slide channel.

7. A surge brake actuator comprising:
    an actuator housing;
    a coupler housing telescopically engaged with said actuator housing such that said coupler housing extends and retracts within said actuator housing;
    a braking system connected to said actuator housing; and
    an offset push rod having a first end connected to said coupler housing and a second end connected to said braking system.

8. The surge brake actuator of claim 7, further comprising a push rod slide connected to said push rod.

9. The surge brake actuator of claim 8, wherein said push rod slide comprises a plurality of teeth on a side of said push rod slide.

10. The surge brake actuator of claim 8, further comprising a lanyard having an end connected to said push rod slide.

11. The surge brake actuator of claim 8, wherein an end of said push rod slide includes a collar.

12. The surge brake actuator of claim 11, further comprising a bracket attached to said coupler housing, said bracket abutting said collar of said push rod slide.

13. A surge brake actuator comprising:
    an actuator housing;
    a coupler housing telescopically engaged within said actuator housing;
    a braking system connected to said actuator housing;
    a push rod having a first end connected to said coupler housing and a second end connected to said braking system; and
    a push rod slide encircling a portion of said push rod, said push rod slide having a plurality of teeth on a side of said push rod slide capable of ratchetingly engaging said coupler housing.

14. The surge brake actuator of claim 13, wherein said push rod is an offset push rod.

15. The surge brake actuator of claim 13, wherein said push rod slide defines an aperture for the inclusion of a lanyard end.

16. The surge brake actuator of claim 13 further comprising at least one coupler slide channel connected to said coupler housing.

17. The surge brake actuator of claim 16, wherein said coupler slide channel is an upper coupler slide channel having a protrusion extending outwardly from said slide channel.

18. The surge brake actuator of claim 17, wherein said protrusion includes a plurality of teeth on a side of said protrusion.

19. The surge brake actuator of claim 16, wherein said slide channel is plastic.

* * * * *